Nov. 20, 1951  T. W. PAUL  2,575,466
DRIVE MECHANISM FOR VEHICLES
AND CONNECTED IMPLEMENTS
Filed Sept. 18, 1947  4 Sheets-Sheet 1
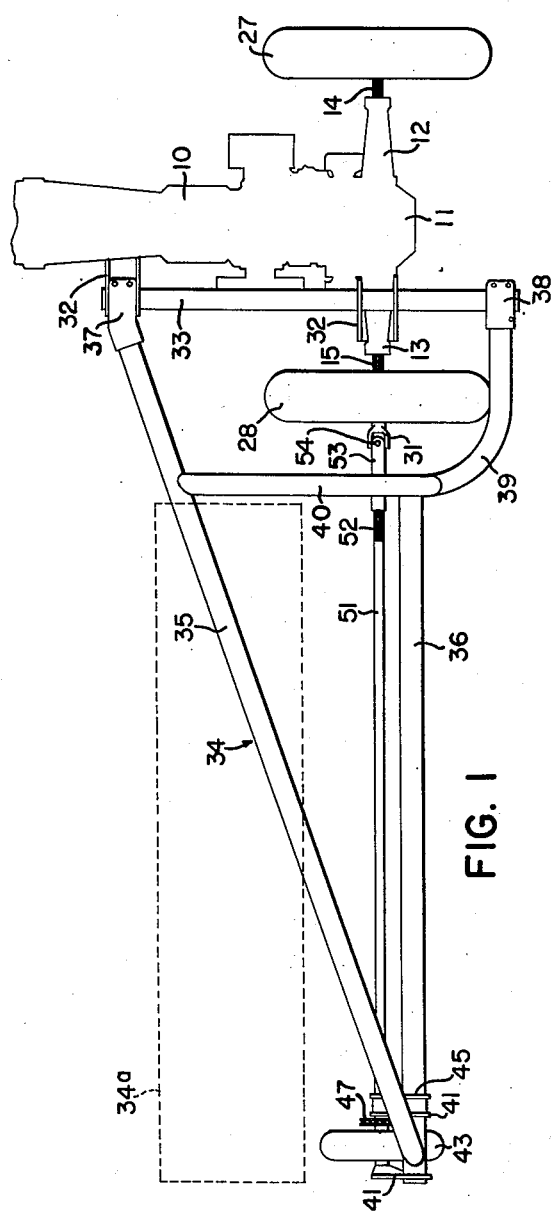
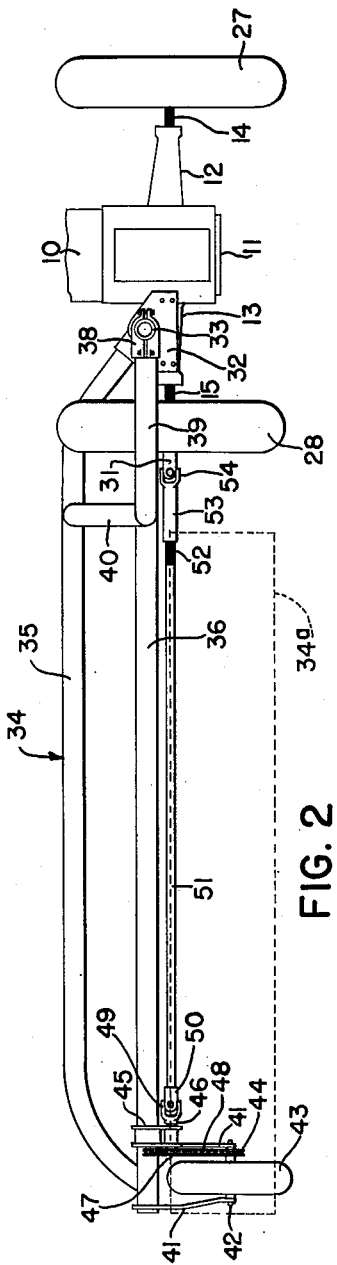
INVENTOR
TALBERT W. PAUL
BY
ATTORNEYS Nov. 20, 1951      T. W. PAUL      2,575,466
DRIVE MECHANISM FOR VEHICLES
AND CONNECTED IMPLEMENTS
Filed Sept. 18, 1947      4 Sheets-Sheet 2
FIG. 3
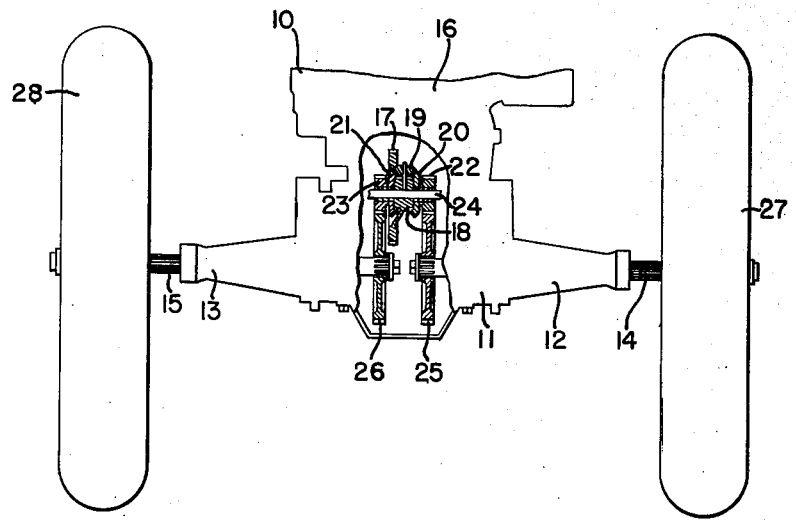
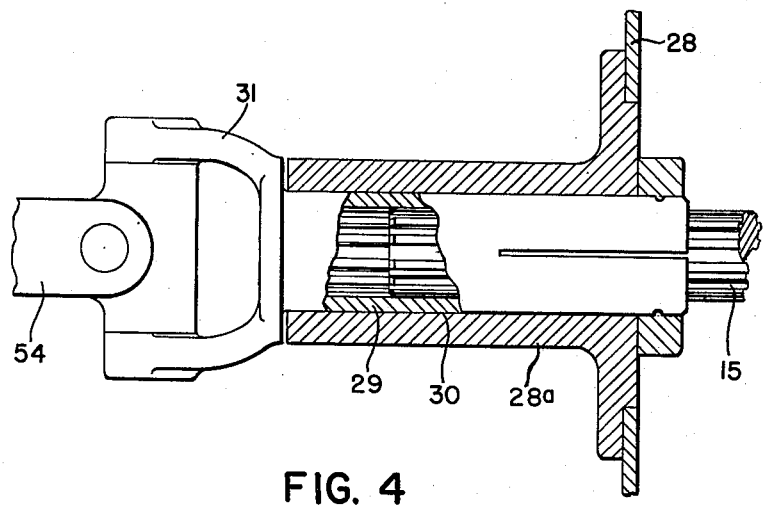
FIG. 4
INVENTOR
TALBERT W. PAUL
BY
ATTORNEYS

INVENTOR
TALBERT W. PAUL
BY
ATTORNEYS

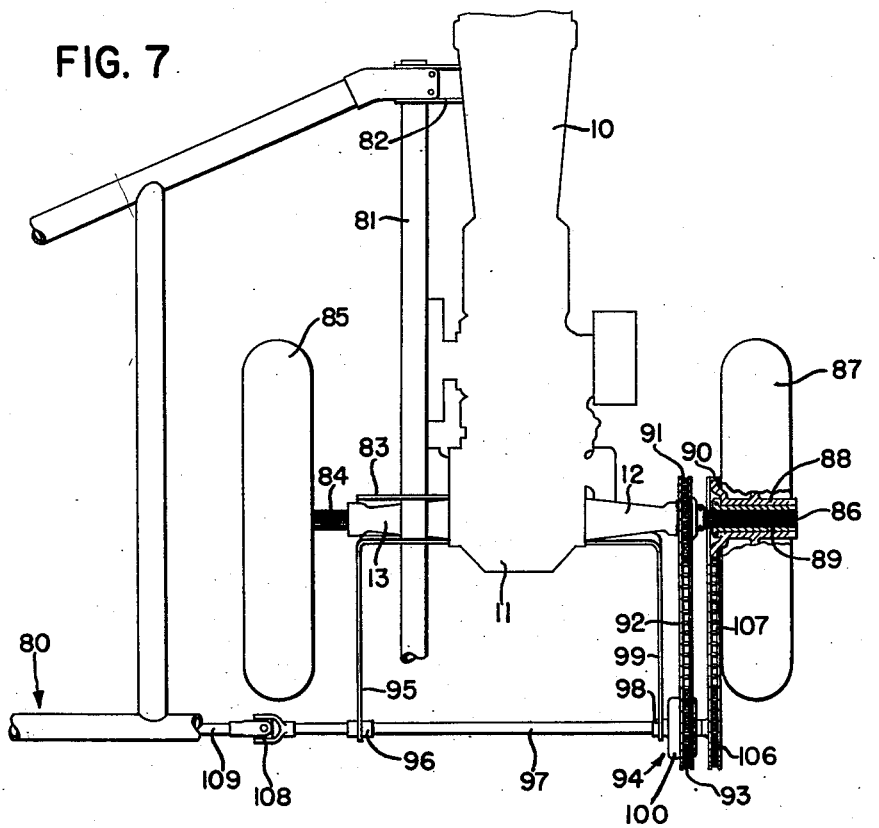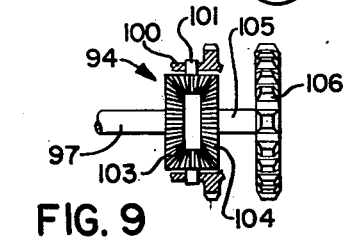

Patented Nov. 20, 1951

2,575,466

UNITED STATES PATENT OFFICE 2,575,466

DRIVE MECHANISM FOR VEHICLES AND CONNECTED IMPLEMENTS

Talbert W. Paul, Moline, Ill., assignor to Deere & Company, Moline, Ill., a corporation of Illinois Application September 18, 1947, Serial No. 774,699

6 Claims. (Cl. 180—14)

This invention relates to an agricultural implement or machine of the type mounted on or connected or attached to and propelled by a tractor or other draft vehicle wherein the implement includes a part of such nature as ordinarily to cause side draft on the propelling vehicle, as in the case of windrower, corn picker or other machine including a frame part that extends laterally of the vehicle and is carried in part on the vehicle and in part on a ground wheel or wheels.

The invention contemplates and has for its principal object the provision of auxiliary driving means for driving the ground wheel or wheels of the implement. It is an important feature of the invention to connect the driving mechanism for the implement wheel to the driving mechanism for the vehicle so that the vehicle driving means and the implement driving means are taken from a common power source. It is likewise an important object to provide power-apportioning means to apportion power between the vehicle traction means and the implement wheel and to provide in various modifications of the invention different types of power-apportioning means having power-apportioning elements for apportioning power in part to at least one of the vehicle traction wheels and in part to the wheel or wheels on the implement.

In one form of the invention, the power is apportioned to a large extent to one of the vehicle wheels and the remainder of the power is apportioned between the other vehicle wheel and the implement wheel. It is a characteristic of all forms of the invention that the final drive and differential mechanism of the propelling vehicle is utilized at least in part as part of the power-apportioning mechanism. This aspect of the invention is important from the standpoint of providing driving mechanism which may be utilized in existing machines without requiring too great a change in such existing structure, thereby contributing to efficiency and economy in both the structure and use of the vehicle and implement unit.

Other objects inherent in and encompassed by the invention will become apparent to those skilled in the art as the disclosure of the invention is completely made in the following detailed description of preferred embodiments of the invention as illustrated in the accompanying sheets of drawings in which:

Figure 1 is a plan view of one form of the invention showing a windrower frame connected to a tractor;

Figure 2 is a rear view of the structure shown in Figure 1;

Figure 3 is an enlarged fragmentary view of the rear portion of a tractor with part of the housing structure thereof broken away to illustrate the part of the power-apportioning means included in the final drive and differential mechanism for the tractor;

Figure 4 is an enlarged fragmentary view partly in section showing one form of means for mounting the tractor wheel on one of the tractor final drive axles;

Figure 7 is a plan view showing a tractor and the inner end of an implement frame mounted thereon and including a different form of power apportioning means;

Figure 8 is a rear view of the structure shown in Figure 7; and

Figure 9 is a schematic sectional view showing a differential or power apportioning means as used in the driving mechanism of the structure shown in Figures 7 and 8.

Figure 5:
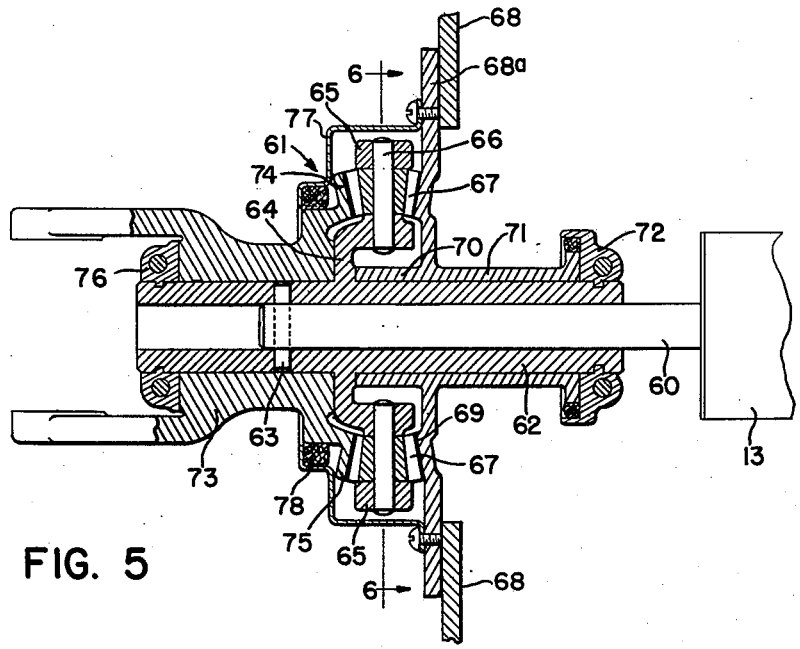
Figure 5 is an enlarged transverse sectional view showing one form of construction by means of which one tractor wheel and an implement wheel are associated with one tractor axle in a manner providing for the apportioning of power between said wheels.

Although each modification of the invention shown herein is characterized by its own particular structural details, it should be understood that these structural details may be interchanged from one form of the invention to the other, and that a description of one form includes generally attributes of other forms of the invention. Likewise it should be understood that the forms of the invention shown are for illustrational purposes only and should not be taken as limiting the scope of the invention.

Figures 1, 2, 3 and 4

In the form of the invention shown here the vehicle-implement unit includes as the propelling vehicle a tractor of conventional construction having a main longitudinal body 10 provided at its rear with a transverse rear axle housing structure 11 including a right hand axle housing 12 and a left hand axle housing 13. The right hand axle housing 12 carries a laterally extending drive shaft or axle 14 and the left hand axle housing carries an oppositely laterally extending drive shaft or axle 15.

The intermediate portion of the rear axle structure 11 is, as is conventional, formed as part of a transmission housing, here indicated generally by the numeral 16. This housing contains the usual transmission and final drive gearing, only a portion of which is shown in Figure 3 as including an output spur gear 17 connected to and including a differential carrier 18. The carrier may be associated in the usual manner with a plurality of bevel pinions 19 in mesh with right and left hand differential gears 20 and 21. The right hand differential gear 20 is preferably formed integral with a right hand spur gear 22 and the left hand differential gear 21 is preferably formed integral with a left hand spur gear 23. The differential mechanism is appropriately journaled on a transverse shaft 24.

The right hand drive shaft or axle 14 is provided with a splined inner end on which is mounted a final drive gear 25. The inner end of the left hand axle 15 similarly carries a final drive gear 26. These gears are respectively in mesh with the spur gears 22 and 23 and provide means whereby power is apportioned from the driving gear 17 to the driving axles 14 and 15.

In this form of the invention the right hand driving axle is keyed or splined to a traction wheel 27 at the right hand side of the tractor. The wheel at the left hand side of the tractor is designated by the numeral 28 and is journaled with respect to the left hand axle 15. The means for mounting the wheel 28 is illustrated in detail in Figure 4, wherein it is shown that the splined outer end of the axle 15 fits within an internally splined sleeve 29, the outer surface of which provides a bearing, as at 30, for the hub 28a of the wheel 28. The left end or outer end of the sleeve has preferably formed integrally therewith a universal joint yoke 31, which provides part of a means for connecting an implement wheel as will be subsequently described.

From the description thus far, it will be seen that power is apportioned from the driving gear 17 to the driving axles 14 and 15 and that the power from the axle 14 is delivered to the right hand traction wheel 27; however, power from the shaft 15 is not delivered to the left hand wheel 28 but is delivered instead to the sleeve 29.

The type of implement frame chosen for the purpose of illustration is representative of one of the types that may appear in connection with the use of a tractor-mounted windrower or similar machine or implement. It should be understood, however, that any other type of implement frame may be utilized. The tractor or vehicle is provided with a pair of longitudinally spaced supporting brackets 32 on which is mounted a longitudinally extending supporting member in the form of a tube 33. The implement frame in general is designated by the numeral 34 and includes front and rear outwardly converging frame members 35 and 36, respectively, the inner ends of which are pivotally connected by means including bearings 37 and 38 to the longitudinal tubular member 33. The connection of the inner end of the rear member 36 to the tube 33 is accomplished by means of an arcuate frame member 39 which is curved to accommodate the left hand tractor wheel 28. A longitudinally extending tubular reenforcing member 40 lying to the left of the wheel 28 interconnects the members 35, 36 and 39 to impart rigidity to the frame 34. A windrower platform is shown diagrammatically in broken lines at 34a as representative of one machine that can be used with the tractor or propelling vehicle. The outer end of the frame 34 includes a pair of downwardly and forwardly inclining arms 41, the lower ends of which carry a transverse short axle 42 on which is mounted a wheel 43. This wheel serves to carry the outer end of the implement frame. The wheel includes at its inner face a sprocket 44 connected thereto for rotation therewith. The frame 34 carries adjacent the inner arm 41 a bracket 45 which journals a short shaft 46, the outer or left hand end of which carries a drive sprocket 47. The sprockets 44 and 47 are appropriately interconnected, as by a roller chain 48, which may be of any conventional type.

The inner end of the short shaft 46 is provided with a universal joint yoke 49 which is connected to a universal joint yoke 50 carried at the outer end of a long power shaft 51. The inner end of the shaft 51 includes a splined connection 52 fitting a sleeve 53 which includes at its inner end a universal joint yoke 54. This yoke is connected to the universal joint yoke 31 on the driving sleeve 29 previously described. The splined connection 52—53 accommodates telescoping of the shaft 51 and sleeve 53 as the outer end of the frame rises and falls as the wheel 43 follows the contour of the ground.

In this form of the invention, power taken from the driving gear 17 is apportioned to the tractor axles 14 and 15 and from these axles is delivered to the right hand traction wheel 27 and to the implement wheel 43. Power is delivered to the implement wheel from the left hand drive axle 15 by the universal joint connections and power shaft 51. There is no power transmitted to the left hand tractor wheel 28 and the apportioning of power between the right hand traction wheel 27 and implement wheel 43 provides driving means at laterally spaced points of the vehicle-implement unit so that there is no tendency of the frame 34 to cause side draft on the unit. It will be noted that the power apportioning means comprises the conventional tractor differential including the parts 17–26 and the tractor axles 14 and 15, and that no major changes are required to accomplish the results achieved by this form of the invention. The sizes of the sprockets 44 and 47 are chosen with respect to the rolling radius of the implement wheel 43 so as to give the wheel 43 the same normal peripheral speed as the right hand tractor wheel 27. In order that the left hand wheel 28 of the tractor may be used without material alteration, the standard left hand hub thereof may be removed and be replaced with the hub 28a (Figure 4) which has a central bore large enough to accommodate the sleeve 29 when fitted over the axle 15.

*Figures 1, 2, 3, 5, and 6*

In this form of the invention the power apportioning means is so constructed and arranged that it delivers part of the driving torque to the left hand tractor wheel 28. For the purposes of describing this form of the invention, reference will be had only generally to Figures 1 and 2 for the purpose of including the implement frame as part of the vehicle-implement unit. Reference will also be had to Figure 3 for the purpose of illustrating the tractor or vehicle differential mechanism.

As shown in Figure 5, the left hand tractor axle 15 is replaced with a left hand axle 60. The axle 60 is here shown as having a smooth surfaced outer end portion (although it may be splined as is the axle 15) for the purpose of accommodating an auxiliary power apportioning mechanism, indicated generally by the numeral 61. This mechanism includes a sleeve 62 which is pinned at 63 to the axle 60. An intermediate portion of the sleeve includes an annular spoked flange 64 provided with peripheral bearing portions 65 which carry radially extending shafts 66 on which are journaled differential pinions 67. The left hand tractor wheel 28 is replaced by a left hand tractor wheel 68. The wheel 68 has its standard hub removed and replaced by a hub 68a that includes a bevel gear 69 in constant mesh with the bevel pinions 67. The hub of the wheel further includes a pair of oppositely extending integral sleeve portions 70 and 71 journaled on the outer cylindrical surface of the sleeve 62. The sleeve 62 extends at its right hand end some what beyond the right hand end of the sleeve 71 and is provided with securing means, preferably including a pair of complementary halves of a cap structure 72. The outer end of the sleeve 62 provides means for journaling a universal joint yoke 73 which is provided adjacent its inner end with an annular radial flange 74 including thereon an integrally formed bevel gear 75 in constant mesh with the bevel pinion 67 previously described. The universal joint yoke 73 is maintained in place on the sleeve 62 by securing means 76 which may be similar to the cap 72 described above. The power-apportioning means may be suitably enclosed, as by a shield or cover 77, which may include a lubricant seal 78.

Figure 6:
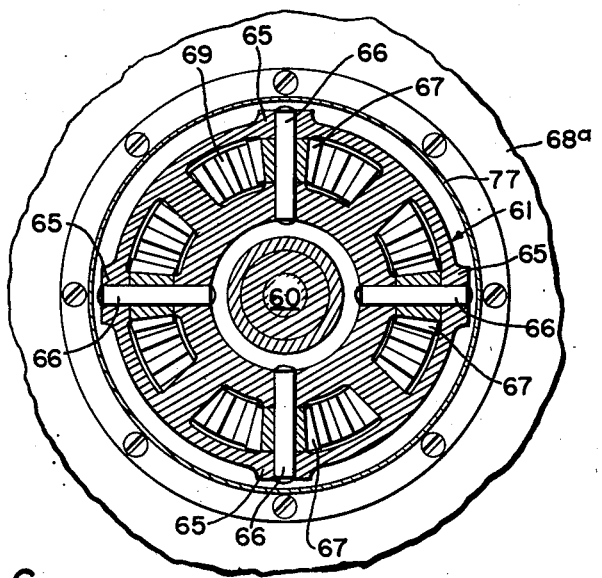
Figure 6 is a sectional view taken along the line 6—6 of Figure 5.

For the purposes of illustration and explaining this form of the invention, the structure shown in Figures 5 and 6 may be assumed to be incorporated in the tractor and implement structure shown in Figures 1 and 2. In this respect the universal joint yoke 73 should be considered as connected to the universal joint yoke 54 at the inner end of the power shaft 51 that extends outwardly to drive the implement wheel 43. The power-apportioning means in this form of the invention includes the tractor differential and the power-apportioning means or differential 61. Power is apportioned by the differential means of the tractor to the right hand axle 14 and to the left hand driving axle 60. Substantially one-half of the driving torque delivered by the tractor final drive mechanism is delivered to the right hand tractor wheel 27. The other half of the driving torque is delivered to the left hand axle 60 and consequently to the sleeve 62 of the power apportioning means 61. Rotation of the sleeve 62 by the left hand driving axle 60 effects rotation of the flange portions 64 and 65, which portions function as the ordinary carrier in a differential, driving the bevel pinions 67 and transmitting power to the bevel gear 69 of the wheel 68 and to the bevel gear 75 of the universal joint yoke 73. The driving torque delivered to the axle 60 is thus apportioned between the left hand tractor wheel 68 and the implement wheel 43 so that the total amount of driving torque delivered by the tractor is apportioned between both tractor wheels and the implement wheel.

In this form of the invention, as in the case of that form described above, the differential action provides for accurate control of the vehicle and implement unit, inasmuch as there is no interference in the driving mechanism caused by turning of the unit to either the left or the right, as is the case of driving mechanisms of the general type heretofore known. Again, as in the case of the structure described in connection with Figures 1 and 2, the sizes of the sprockets 44 and 47 are so related to the wheel 43 to give the wheels 27, 68 and 43 the same normal peripheral speeds.

*Figures 7, 8 and 9*

In this form of the invention, the inner or left hand tractor wheel is driven by one-half the driving torque delivered by the tractor and the remainder of the driving torque is apportioned between the right hand tractor wheel and the implement wheel. The implement frame shown here is designated generally by the numeral 80 and only a portion thereof is illustrated. Reference is had to Figures 1 and 2 for the general type of frame structure that may be included in the frame 80. The supporting of the frame 80 on the tractor for pivotal movement on a longitudinal axis is accomplished by a supporting frame or pipe 81 carried on the tractor by brackets 82 and 83 at the front and rear, respectively, of the tractor.

Reference is had to Figure 3 for illustration of the final drive and differential mechanism of the tractor. In this instance different reference characters will be applied to the tractor drive axles and wheels for the purpose of avoiding confusion with structure previously described. The left hand driving axle is designated by the numeral 84 and the left hand wheel is indicated by numeral 85. The right hand axle is designated by the numeral 86 and the numeral 87 applies to the right hand wheel. The frame 80 should be considered as being supported at its outer end on an implement wheel similar to the wheel 43 of the structure previously described. The driving axles 84 and 86 are connected to the output gears 25 and 26 in the manner in which the axles 14 and 15 are connected to those gears as shown in Figure 3.

The wheel 87 includes a hub 88 which is journaled on a sleeve 89 carried on the outer end of the right hand axle 86. The hub is provided with an integral sprocket 90 at its inner face. The axle 86 carries for rotation therewith, just outwardly of the right hand axle housing 12, a driving sprocket 91. The sprocket is connected by a chain 92 to a sprocket 93 on power apportioning mechanism designated by the numeral 94 and carried at the rear right hand side of the tractor. The left hand axle housing 13 of the tractor rigidly carries a rearwardly extending bracket 95 which is provided with a bearing 96 for journaling a transverse power shaft 97. The shaft 97 is further journaled in a bearing 98 carried by a bracket 99 which extends forwardly and which is rigidly secured to the right hand axle housing 12 of the tractor.

The sprocket 93 of the power apportioning means 94 is preferably formed integral with a cylindrical casing or drum designated by the numeral 100 (Figure 9). The casing 100 carries a plurality of radially extending short shafts 101 on each of which is carried a bevel pinion 102. These pinions are in constant mesh with a pair of power-apportioning or differential gears 103 and 104, 103 being the left hand gear and 104 the right hand gear. The left hand gear 103 is keyed to or otherwise made fast on the shaft 97 for rotation therewith. The right hand gear 104 is keyed to or otherwise secured to a short outwardly extending shaft 105 on which is keyed a sprocket 106. The sprocket 106 is connected by a driving chain 107 to the sprocket 90 on the right hand tractor wheel 87. The power shaft 97 is connected by a universal joint 108 to a shaft 109 that extends to the left and may be connected to a wheel for supporting the implement frame 80, the connection and supporting of the wheel being similar to the structure shown in Figures 1 and 2.

Power delivered by the tractor final drive mechanism proceeds to the tractor axles 84 at the left and 86 at the right. The left hand wheel 85 is connected directly to the left hand axle 84 and thus receives substantially one-half of the driving torque. The other one-half of the driving torque is divided between the right hand tractor wheel 87 and implement supporting wheel (not shown) by means of the power-apportioning means 94, which operates in conjunction with the power-apportioning mechanism comprising the tractor differential. In this respect the structure and results are similar to those shown and described in connection with the modification of Figures 1, 2, 3, 5 and 6, with the exception that there the right hand tractor wheel receives one-half the total driving torque and the left hand wheel receives part of the driving torque apportioned between said wheel and implement wheel; in the instance referred to here, the left hand wheel 85 receives one-half the total driving torque, while the other half of the driving torque is apportioned between the right hand tractor wheel and the implement carrying wheel. This structure is preferred, inasmuch as the driving of the left hand tractor wheel 85 by as much driving torque as possible is more suitable for the purposes of operating the vehicle-implement unit. This result follows from the fact that the implement structure extends at the left of the unit and it is at that side that side draft will occur. Power is apportioned between the right hand tractor wheel 87 and the implement-carrying wheel by means of the power apportioning means 94 which derives substantially one-half the driving torque from the right hand tractor axle 86 by the driving sprocket 91. The power is divided by the differential or power-apportioning means contained within the casing 100 and comprising the gearing 102, 103 and 104, whereby the power is split between the shafts 97 and 105.

In this form of the invention the relationship between the right hand driving axle 86 and the wheel 87 is similar to the relationship between the left hand driving axle 15 and left hand tractor wheel hub 28a of the structure of Figure 1; that is to say, the axle 86 is encircled by the replacement hub 88 for the purpose of accommodating the sleeve 89, which serves as a bearing for the hub. Likewise, the relationship of the drive to the implement carrying wheel is the same with respect to the tractor wheels 85 and 87 so that all three wheels may have the same peripheral speeds during straight-ahead travel. The results obtainable in connection with controlling or steering the unit are the same as those that follow the structure set forth in connection with Figures 1 to 4 or the structure of Figures 5 and 6.

*Summary*

In all forms of the invention, one of the primary features resides in the provision of driving mechanism that includes means for apportioning power between elements such as the vehicle wheel or wheels and another element such as the implement-carrying wheel or wheels. As previously stated it is an important feature of the invention to utilize to the greatest extent possible the power-apportioning means provided in the form of the tractor differential; although, other primary or auxiliary power sources may be resorted to. It will be appreciated, of course, that the basic principles of the invention as illustrated herein may be considerably modified and utilized in instances other than those disclosed herein. The disclosed structures have been selected as the basis for illustrating the preferred embodiments of the invention and it is not intended that the scope of the invention be limited other than by the claims which follow.

I claim:

1. In a tractor and implement unit wherein the tractor has a body carried between first and second ground-engaging wheels and is provided with power-transmitting means including first and second power shafts interconnected by differential drive means, the first of said shafts being drivingly connected to the first wheel to normally deliver to said first wheel part of the torque output of the power-transmitting means, and wherein the implement comprises a supporting frame having spaced frame portions, one frame portion being connected to the tractor body and the other frame portion being supported on a ground-engaging implement wheel separate from the tractor, the improvement comprising: means for connecting the second tractor wheel to the second shaft in tractor-supporting relationship and including a bearing journaling said second tractor wheel on said second shaft for rotation of said second tractor wheel at times at speeds different from speeds of rotation of the second shaft; and a driving connection for drivingly interconnecting the second shaft and the implement wheel to normally deliver to said implement wheel part of the torque output of the power-transmitting means of the tractor.

2. The invention defined in claim 1, further characterized in that: the bearing in the connection between the second shaft and the second tractor wheel provides for free rolling of the second tractor wheel relative to said second shaft; and the driving connection to the implement wheel is direct, whereby power is normally apportioned by the tractor differential drive means one half to the first tractor wheel and one half to the implement wheel.

3. The invention defined in claim 1, further characterized in that: the connection between the second shaft and the second tractor wheel includes second differential drive means in addition to the tractor differential drive means; said second differential drive means includes a driving connection to the second tractor wheel; and the driving connection between the second shaft and implement wheel is via said second differential drive means whereby the power output of the second shaft is apportioned between the second wheel and the implement wheel.

4. The invention defined in claim 1, further characterized in that: the connection between the second shaft and the second tractor wheel includes a sleeve drivingly connected to the second shaft; the bearing for the second tractor wheel is on the sleeve; the sleeve has fixed thereto a coaxial flexible driving element; and the driving connection between the second shaft and the implement wheel is effected via said driving element.

5. The invention defined in claim 1, further characterized in that: the connection between the second shaft and the second tractor wheel includes a sleeve drivingly connected to the second shaft; the bearing for the second tractor wheel is on the sleeve; the sleeve has fixed thereto a differential gear carrier including differential pinions; a first differential ring gear is fixed to the second tractor wheel and meshes with the pinions at one side of said carrier; a second differential ring gear meshes with the pinions at the other side of the carrier; the driving connection between the second shaft and the implement wheel is via said second ring gear; and said driving connection further includes a flexible driving element.

6. The invention defined in claim 1, further characterized in that: supporting structure is provided for fixed mounting on the tractor; a third shaft is journaled on the supporting structure in spaced relation to the second shaft and has journaled thereon a differential carrier and pinion unit; drive means connects the second shaft and said carrier and pinion unit; the connection between the second shaft and the second tractor wheel includes a first ring gear differentially driven by said carrier and pinion unit and drivingly connected to the second tractor wheel; and the driving connection between the second shaft and implement wheel includes drive means between said implement wheel and said third shaft and a second ring gear differentially driven by said carrier and pinion unit and drivingly connected to said third shaft.

TALBERT W. PAUL.

REFERENCES CITED

The following references are of record in the file of this patent:

UNITED STATES PATENTS

| Number | Name | Date |
|---|---|---|
| 1,651,642 | Stanfield | Dec. 6, 1927 |
| 1,755,524 | Stanfield | Apr. 22, 1930 |
| 1,828,073 | Robinson | Oct. 20, 1931 |
| 1,979,598 | Ash | Nov. 6, 1934 |

FOREIGN PATENTS

| Number | Country | Date |
|---|---|---|
| 167,042 | Great Britain | Mar. 7, 1921 |
| 466,062 | Germany | Oct. 1, 1928 |